(12) United States Patent
Shukrun et al.

(10) Patent No.: US 11,707,159 B1
(45) Date of Patent: Jul. 25, 2023

(54) ELECTRIC PLATTER

(71) Applicants: Meitar Shukrun, Moshav Azricam (IL); Avraham Shukrun, Moshav Azricam (IL)

(72) Inventors: Meitar Shukrun, Moshav Azricam (IL); Avraham Shukrun, Moshav Azricam (IL)

( * ) Notice: Subject to any disclaimer, the term of this patent is extended or adjusted under 35 U.S.C. 154(b) by 0 days.

(21) Appl. No.: 17/829,396

(22) Filed: Jun. 1, 2022

(51) Int. Cl.
*A47J 39/00* (2006.01)
*A47J 36/34* (2006.01)
*A47J 36/24* (2006.01)
*A47J 27/12* (2006.01)

(52) U.S. Cl.
CPC ............ *A47J 39/006* (2013.01); *A47J 27/12* (2013.01); *A47J 36/2483* (2013.01); *A47J 36/34* (2013.01)

(58) Field of Classification Search
CPC ...... A47J 39/006; A47J 27/12; A47J 36/2483; A47J 36/34

USPC .......................................................... 219/385
See application file for complete search history.

(56) References Cited

U.S. PATENT DOCUMENTS

| | | | |
|---|---|---|---|
| 4,110,587 A | 8/1978 | Souder, Jr. et al. | |
| 5,948,301 A * | 9/1999 | Liebermann | A47J 36/2483 219/395 |
| 6,265,695 B1 | 7/2001 | Liebermann | |
| 6,658,994 B1 * | 12/2003 | McMillan | A47F 3/001 219/214 |
| 2022/0160170 A1 * | 5/2022 | Casey | A47J 36/34 |

\* cited by examiner

*Primary Examiner* — Dana Ross
*Assistant Examiner* — James F Sims, III
(74) *Attorney, Agent, or Firm* — The Roy Gross Law Firm, LLC; Roy Gross

(57) ABSTRACT

A two-story electric platter where more pots can be heated over the same ground surface. The second story may be removable or permanently attached to the first electric platter. An optional guard rail can protect the pots from falling off the electric platter.

7 Claims, 3 Drawing Sheets

ELECTRIC PLATTER

TECHNICAL FIELD

The present invention relates to electric platters in general and in particular to two-stories electric platters.

BACKGROUND ART

Electric platters are used to heat food. Jews who observe Sabbath use electric platters (turned on before the Sabbath or any other religious holiday) to heat food on Saturdays and on religious holidays so they don't turn on the stove top, manipulating gas or electricity, on Saturday or any other religious holiday. The size of the electric platters determines how many food containers (pots, bowls etc.) it can heat, and if one needs to heat more food beyond the capacity of the platter, then one needs to use an additional electric platter.

SUMMARY OF INVENTION

The present invention relates to two-story electric platter where more pots can be heated over the same ground surface. The second story may be removable or permanently attached. An optional guard rail can protect the pots from falling off the electric platter. The guard rail may be only for the top heating surface or for both.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to an electric platter, comprising:

(i) a first heating surface including an electric connection and a plurality of first connection elements;

(ii) a second heating surface including a plurality of second connection elements, removably attached to the first heating surface; and (i) (iii) a plurality of connection pillars coupled to the first and second connection elements so that the second heating surface is positioned above the first heating surface, wherein the second heating surface is electrically connected to the first heating surface, via electric wires in at least one connection pillar.

Figure 1:
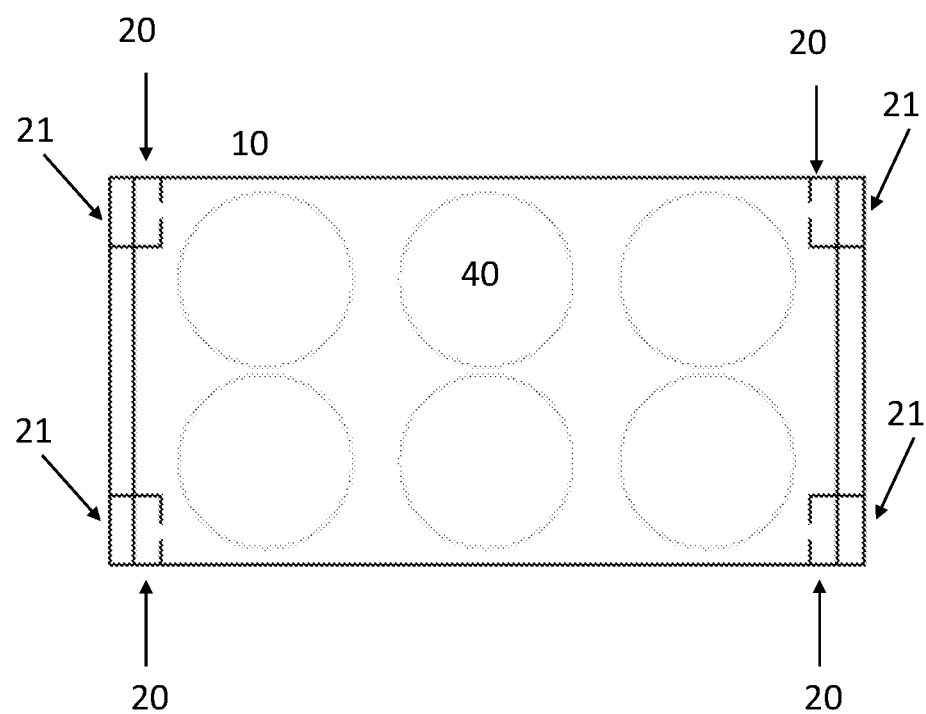
FIG. 1 shows a first heating surface.

Reference is now made to FIG. 1 showing a first heating surface 10 and first connection elements 20 or 21 on each corner of the first heating surface 10. The connection element 20 may fit an external connection pillar (not shown), that is the connection pillar is external to the heating surface 10. The connection element 21 may fit an internal connection pillar 80 (not shown), that is the connection pillar 80 is on the surface of the heating surface 10. A plurality of food containers, in different sizes (e.g. pots) 40 can be placed on top of the heating surface 10 (the container positions are shown for illustrations purposes only). Optionally, a surrounding guard rail 50 (not shown) can be removably or permanently positioned on the perimeter of the heating surface 10 so that the pots 40 don't accidently tip off the electric platter.

Figure 2:
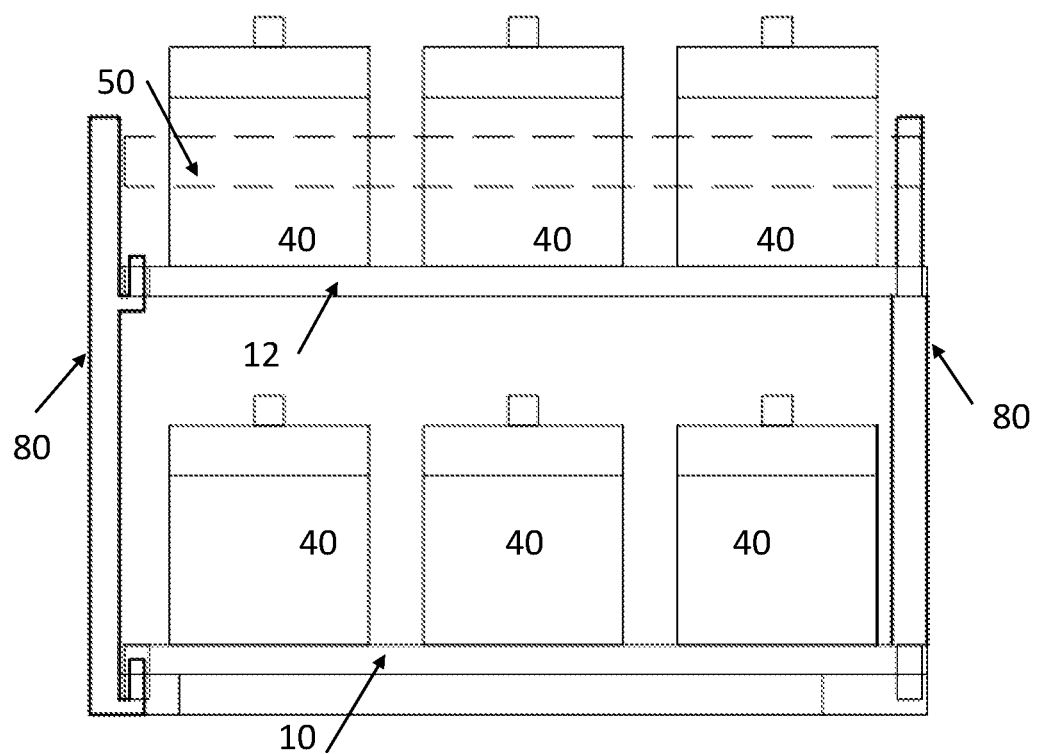
FIG. 2 shows an embodiment of an electric platter of the invention with a first and a second heating surfaces.

FIG. 2 shows the electric platter of the invention wherein a second heating surface 12 is positioned above the first heating surface 10. The second heating surface 12 comprises a plurality of second connection elements 20/21 (not shown). The first connection elements 20/21 and the second connection elements 20/21 connect to connection pillars 80 so that the second heating surface is positioned above the first heating surface.

The first (bottom) heating surface 10 has an electric connector (not shown) that can connect it to an electric outlet. In some embodiments, the first and second heating surfaces 10, 12 are turned on and off together.

Optionally, a surrounding guard rail 50 can be removably or permanently positioned on the perimeter of the heating surface 10 and/or 12 so that the pots 40 don't accidently tip off the electric platter.

In some embodiments, the first and second heating surfaces 10, 12 are turned on and off separately (individually).

The first and second heating surfaces 10, 12 can have a shared electric connection or have separate, individual electric connections.

In some embodiments, the second heating surface 12 is electrically connected to the first heating surface 10, via electric wires in at least one connection pillar 80. The first and second heating surfaces 10, 12 can have a shared electric connection by connecting the first and second heating surfaces 10, 12 via electric cables running through at least one connection pillar 80.

In some embodiments, the connection pillar 80 adapted to connect the two heating surfaces electrically, may have a top and a bottom electric connectors on the side (not shown), adapted to plug in matching electric connectors (like an electric socket plugging into an electric outlet) on the first and second heating surfaces 10, 12.

In some embodiments, additional heating surfaces may be positioned on top of the second heating surface 12, that is 3 or 4 or more heating surfaces one on top of the other.

In some embodiments, the second heating surface 12 can have an on-off switch, that can be coupled, for example, to the first and second heating surface 10.

Figures 3A, 3B:
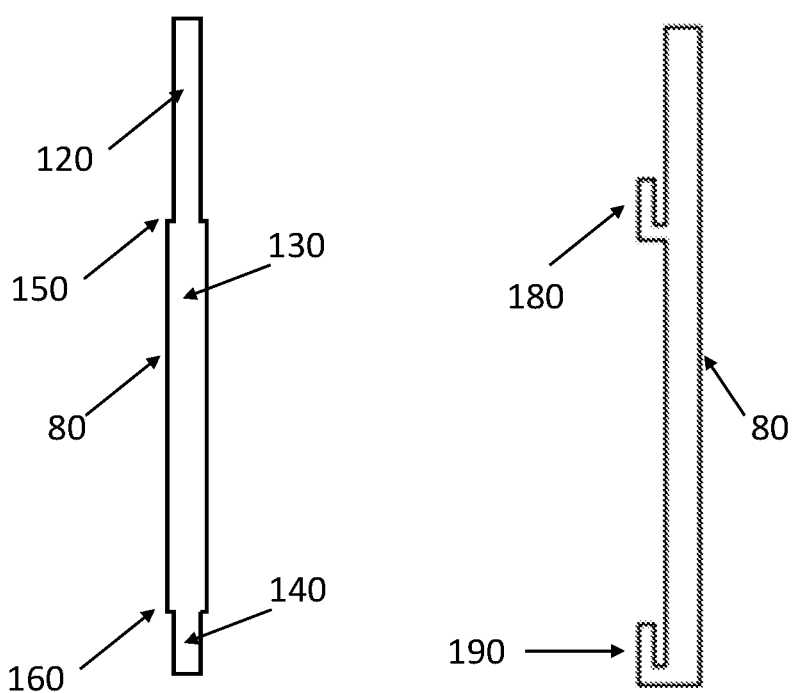
FIGS. 3A-3B show embodiments of connection pillars.

FIGS. 3A-3B show different embodiments of connection pillars 80.

FIG. 3A shows an embodiment of an internal connection pillar 80 (shown on the right side of FIG. 2) having a top portion 120 that is narrower than a middle portion 130 such that the top of the middle portion 130 serves as a break 150 when inserting the second heating surface 12. A bottom portion 140 of the connection pillar 80 is narrower than the middle portion 130 such that the bottom portion 140 can enter an opening 21 in the first heating surface 10. In the embodiment of FIG. 3A, the connection elements 21 of the first and second heating surfaces 10, 12 are openings adapted to the size of the connection pillars 80. The connection pillar 80 may be preferably removably connected to the first heating surface 10 or permanently connected to the first heating surface 10.

FIG. 3B shows an embodiment of connection pillar 80 (shown on the left side of FIG. 2) having a top hook 180 adapted to connect to a second connection element and a bottom hook 190 adapted to connect to a first connection element 20. In the embodiment of FIG. 3B, the connection elements 20 of the first and second heating surfaces 10, 12 are openings adapted to be coupled to the top hooks 180 and bottom 15 hooks 190.

In some embodiments, the first connection elements 20 are permanently connected to the connection pillars 80.

In some embodiments, the first connection elements 20 are detachably connected to the connection pillars 80.

In some embodiments, the second connection elements are permanently connected to the connection pillars 80.

In some embodiments, the second connection elements are detachably connected to the connection pillars 80.

The first connection elements 20 may be identical or different from the second connection elements.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. An electric platter, comprising:
    a. a first autonomous heating surface including an electric connector adapted to connect to an electric outlet and a plurality of first connection elements;
    b. a second heating surface including a plurality of second connection elements, removably attached to the first heating surface; and
    c. a plurality of connection pillars detachably connected to the first and second connection elements, thus connecting the first heating surface and the second heating surface, so that the second heating surface is positioned above the first heating surface, wherein the second heating surface is electrically connected to the first heating surface, via electric wires in at least one connection pillar and wherein the first heating surface further comprises a removable surrounding guard rail.

2. The electric platter of claim 1, wherein the second heating surface further comprises a removable surrounding guard rail.

3. The electric platter of claim 1, wherein the second heating surface further comprises an independent electric connector adapted to connect to an electric outlet.

4. The electric platter of claim 1, wherein the second heating comprises an on-off switch.

5. The electric platter of claim 4, wherein said on-off switch is coupled to the first heating surface.

6. The electric platter of claim 1, wherein the first and second heating surfaces are turned on and off together.

7. The electric platter of claim 1, wherein the first and second heating surfaces are turned on and off separately.

* * * * *